No. 853,013. PATENTED MAY 7, 1907.
L. C. GUTTERY.
CORN SHOCK COMPRESSOR.
APPLICATION FILED DEC. 3, 1906.
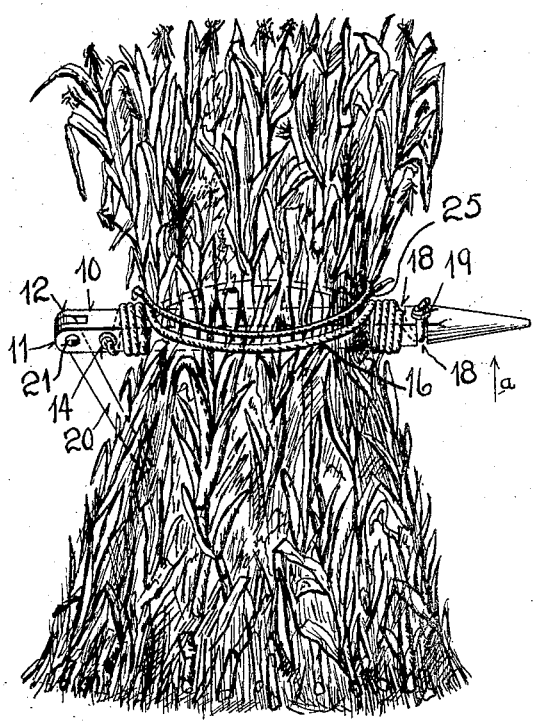
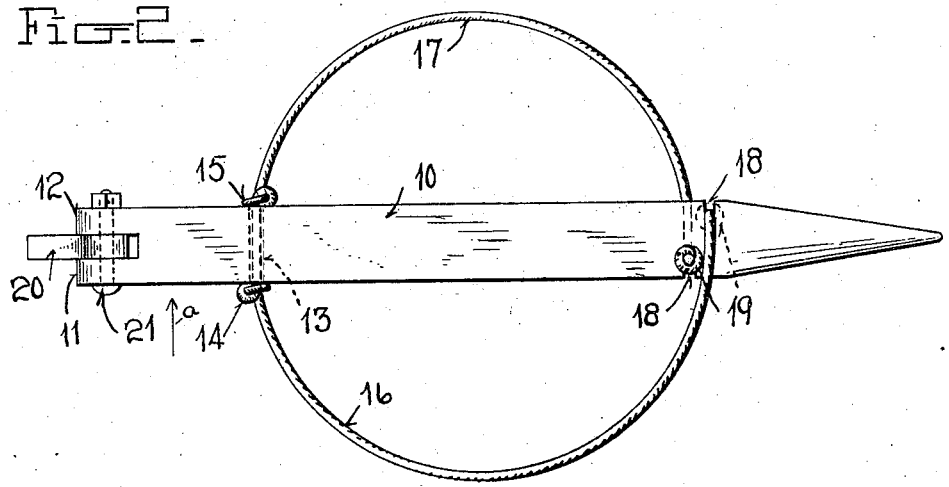
Witnesses
L. B. James
C. H. Griesbauer
Inventor
Lewis C. Guttery
by A. B. Wilson &co
Attorneys
THE NORRIS PETERS CO., WASHINGTON, D. C.

UNITED STATES PATENT OFFICE.

LEWIS C. GUTTERY, OF LEBANON, OHIO.

CORN-SHOCK COMPRESSOR.

No. 853,013.   Specification of Letters Patent.   Patented May 7, 1907.

Application filed December 3, 1906. Serial No. 346,100.

*To all whom it may concern:*

Be it known that I, LEWIS C. GUTTERY, a citizen of the United States, residing at Lebanon, in the county of Warren and State of Ohio, have invented certain new and useful Improvements in Corn-Shock Compressors; and I do declare the following to be a full, clear, and exact description of the invention, such as will enable others skilled in the art to which it appertains to make and use the same.

This invention relates to a shock compressor.

The object of the invention is to provide a shock compressor in which the strain is distributed equally on both ends of the piercing spear so that the shock is compressed equally in all directions and consequently there is no twisting of the shock from an erect position.

Figure 1 of the accompanying drawings represents a side elevation of a shock of corn with this improved compressor applied; and Fig. 2 represents a top plan view of the compressor.

In the embodiment illustrated, a spear 10 of any suitable material has its rear end bifurcated to form spaced lugs 11 and 12 between which a handle 20 is pivoted by a bolt 21. A flexible or binding compressing element is secured intermediately of its ends to said spear near its rear end preferably by passing it through a transverse aperture 13 in said spear and tying knots 14 and 15 in said binding element adjacent to the opposite sides of the spear to hold said element firmly against movement and providing two oppositely extending members 16 and 17. This flexible binding element may be composed of a stout cord, a chain or wire cable, as desired.

The spear 10 is provided near its pointed end with securing means for engaging the free ends of the binding cord which are preferably made in the form of grooves or slits as 18 in the sides of the spear. The free ends of the cord members 16 and 17 have stops thereon preferably in the form of knots as 19 to hold said cord members against slipping when compressing a shock.

In the use of this device, the spear 10 is thrust through the shock as shown in Fig. 1 and the binding members 16 and 17 are passed around the opposite sides of the shock and their free knotted ends engaged with the slits as 18 in the pointed end of the spear, the cord member 16 attached to one side of the spear being passed over the spear into the slit on the opposite side with its stop knot on the lower face thereof and the cord member 17 on the other side of the spear is passed under the spear into the slit on the opposite side to which it is attached with its stop knot on the upper face of the spear. The handle is then bent at right angles to the spear and turned in the direction indicated by the arrow *a* whereby the binding members 16 and 17 are wound on both ends of the spear, as shown in Fig. 1, thus compressing the shock equally in all directions. The handle is then turned inwardly into the shock to lock the binder in position thereon. A cord 25 is then tied around the shock and the compressor may then be removed. This is accomplished by disengaging the handle from the shock and turning the spear in a direction opposite to that in which it is turned to compress the shock and the cord members will be unwound and the ends automatically disengaged from the grooves in the pointed spear end.

Having thus described the invention, what is claimed as new, is:—

1. A shock compressor comprising a spear having flexible binding members secured at one end to the shaft of the spear and means near the point of the spear for engaging the free ends of said binding members.

2. A shock compressor comprising a spear having flexible binding members secured at one end to the shaft of the spear and means near the other end of the spear for engaging the free ends of said binding members and a handle pivoted to the shaft of said spear.

3. A shock compressor comprising a spear having flexible binding members secured at one end to the shaft of the spear and means near the point of the spear for engaging the free ends of said binding members, said spear having spaced apertured lugs at the end of the shaft and a handle pivoted between said lugs.

4. A shock compressor comprising a spear having flexible binding members secured at one end to the shaft of the spear and having stops at their free ends, said spear having grooves or slits formed in its opposite sides near its pointed end to receive the free ends of said binding members.

5. A shock compressor comprising a spear having a handle pivoted to one end thereof and a piercing point at its other end, a flexible binding element passed transversely through said spear near its handle end and having stops at the opposite sides of said spear and means near the pointed end of said spear for engaging the free ends of said binder element.

In testimony whereof I have hereunto set my hand in presence of two subscribing witnesses.

LEWIS C. GUTTERY.

Witnesses:
J. T. DEARDOFF,
LAURA M. CAREY.